United States Patent
Chen et al.

(10) Patent No.: US 11,832,199 B2
(45) Date of Patent: Nov. 28, 2023

(54) OVER-THE-AIR SYNCHRONIZATION OF RADIO NODES IN A RADIO ACCESS NETWORK

(71) Applicant: Corning Optical Communications LLC, Charlotte, NC (US)

(72) Inventors: Tsung-Yi Chen, San Jose, CA (US); Olivier Duval, Pacifica, CA (US); Hithesh Nama, Centennial, CO (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 18/096,263

(22) Filed: Jan. 12, 2023

(65) Prior Publication Data
US 2023/0156638 A1    May 18, 2023

Related U.S. Application Data (63) Continuation of application No. 17/403,237, filed on Aug. 16, 2021, now Pat. No. 11,582,708, which is a continuation of application No. 16/774,916, filed on Jan. 28, 2020, now Pat. No. 11,096,136.

(60) Provisional application No. 62/798,560, filed on Jan. 30, 2019.

(51) Int. Cl.
*H04W 56/00*    (2009.01)

(52) U.S. Cl.
CPC .................. *H04W 56/001* (2013.01)

(58) Field of Classification Search
CPC .................. H04W 56/00; H04W 56/001
See application file for complete search history.

(56) References Cited

U.S. PATENT DOCUMENTS

| | | | |
|---|---|---|---|
| 8,982,841 B2* | 3/2015 | Srinivasan | H04W 36/165 370/331 |
| 2015/0063327 A1* | 3/2015 | Barriac | H04W 72/23 370/337 |
| 2020/0245273 A1* | 7/2020 | Chen | H04W 56/001 |
| 2021/0377891 A1* | 12/2021 | Chen | H04W 56/001 |

* cited by examiner

*Primary Examiner* — Kyaw Z Soe
(74) *Attorney, Agent, or Firm* — William D. Doyle (57) ABSTRACT

A method is provided for synchronizing timing in phase and frequency of clocks associated with a plurality of radio nodes (RNs) in a small cell radio access network (RAN) having an access controller operatively coupled to each of the RNs. In accordance with the method, a donor list is generated for each given RN in the RAN. The donor list represents an ordered list of potential wireless access points that are able to serve as a source of a wireless sync signal for the given RN. The donor lists are distributed to the respective RNs. An access point is selected by each of the RNs from their respective donor lists to use as a sync signal source. Each of the RNs synchronize their respective clocks in phase and frequency using wireless sync signals received from the respective selected access points.

10 Claims, 4 Drawing Sheets

OVER-THE-AIR SYNCHRONIZATION OF RADIO NODES IN A RADIO ACCESS NETWORK

PRIORITY APPLICATION

This application is a continuation of U.S. application Ser. No. 17/403,237, filed Aug. 16, 2021, which is a continuation of U.S. application Ser. No. 16/774,916, filed Jan. 28, 2020, now U.S. patent Ser. No. 11/096,136, which claims the benefit of priority under 35 U.S.C. § 119 of U.S. Provisional Application Ser. No. 62/798,560, filed Jan. 30, 2019, the content of which is relied upon and incorporated herein by reference in its entirety.

BACKGROUND

Packet-based timing methods are important for delivering timing over packet-switched networks. In particular, the Precision Timing Protocol (PTP) specified in IEEE 1588-2008 is becoming a defacto standard for delivering timing information (time/phase/frequency) from a Grand Master (GM) clock to slave clocks in end application-specific equipment such as wireless base stations providing mobile telephony services, which require precise timing. The Grand Master clock provides timing information over the packet-switched network to the slave clocks by exchanging packets with embedded time-stamps related to the time-of-arrival and time-of-departure of the timing packets. The slave clock utilizes this information to align its time (and frequency) with the Grand Master. The Grand Master is provided an external reference to serve as the basis for time and frequency. Most commonly this reference is derived from a Global Navigation Satellite System (GNSS) such as the GPS System that in turn is controlled by the US Department of Defense and its timing controlled very precisely and linked to the US Naval Observatory. Time alignment to the GPS clock is, for all practical purposes equivalent to time alignment to UTC.

In some cases the wireless base stations may include a GNSS (e.g. GPS) receiver. The GNSS receiver utilizes the available radio frequency signals from the GNSS satellites and from that determines its position (e.g. latitude/longitude/height) as well as time. From this the receiver can generate a timing signal, together with a messaging channel carrying a data stream comprising the time-of-day at the defining pulse-edge (signal transition) of the signal. This combination of event signal and messaging channel is referred to as 1PPS+ToD. The backhaul channel whereby the small cell connects with the network can still be used to carry packet-based timing signals (e.g. PTP) and this can be used as a back-up to generate timing for the small cell when the GNSS signal is interrupted for any reason.

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor voice and data services to enterprises and other customers. However, when the small cells are deployed indoors a built-in GNSS antenna may not have adequate signal strength or quality to provide a good timing solution.

SUMMARY

In accordance with one aspect of the present disclosure, a method is provided for synchronizing timing in phase and frequency of clocks associated with a plurality of radio nodes (RNs) in a small cell radio access network (RAN) having an access controller operatively coupled to each of the RNs. In accordance with the method, a donor list is generated for each given RN in the RAN. The donor list represents an ordered list of potential wireless access points that are able to serve as a source of a wireless sync signal for the given RN. The donor lists are distributed to the respective RNs. An access point is selected by each of the RNs from their respective donor lists to use as a sync signal source. Each of the RNs synchronize their respective clocks in phase and frequency using wireless sync signals received from the respective selected access points.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Overview

One type of small cell radio access network (RAN) architecture that is currently deployed includes a network of radio nodes connected to a centralized access controller or aggregation node. One example of such a controller or node is the Services Node available from Spidercloud, Wireless Inc. The centralized access controller or aggregation node may be implemented as an enterprise premise-based controller element that coordinates the radio nodes (RNs) in the network. In an LTE embodiment, the access controller functions as a local, premises-based gateway that anchors and aggregates a group of LTE RNs. One particular example of such an access controller is the Spidercloud Services Node. Details concerning the Spidercloud Services Node may be found in U.S. Pat. No. 8,982,841, which is hereby incorporated by reference in its entirety.

Since the radio nodes and the centralized access controller are often deployed in an indoor environment, it is desirable to synchronize the timing of the clocks in all of the radio access nodes in both frequency and phase without the need for an external clock source, a GNSS source, or a wired link. That is, it is desirable to synchronize the radio oscillators in all the radio access nodes using wireless signals. As described in more detail below, in some embodiments the radio access nodes in a small cell RAN are synchronized in both frequency and phase using LTE signals (in the case of an LTE network) or UMTS signals (in the case of a UNITS network).

Operating Environment

Figure 1:
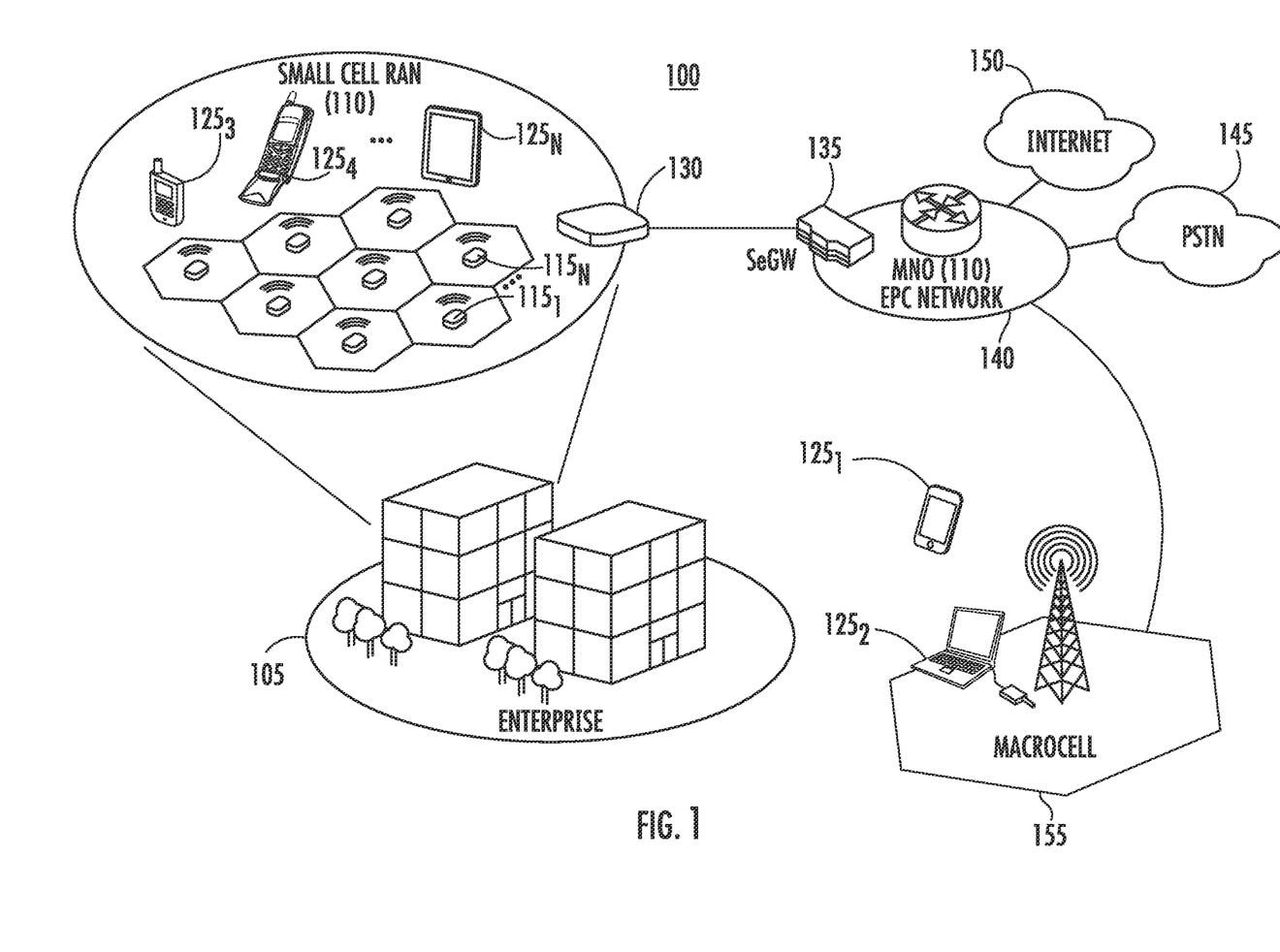
FIG. 1 shows one example of a mobile telecommunications environment that includes an enterprise in which a small cell RAN is implemented.

FIG. 1 shows one example of a mobile telecommunications environment 100 that includes an enterprise 105 in which a small cell RAN 110 is implemented. The small cell RAN 110 includes a plurality of radio nodes (RNs) 1151 . . . 115N. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 1251-125N in FIG. 1).

The small cell RAN 110 includes an access controller 130 that manages and controls the radio nodes 115. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
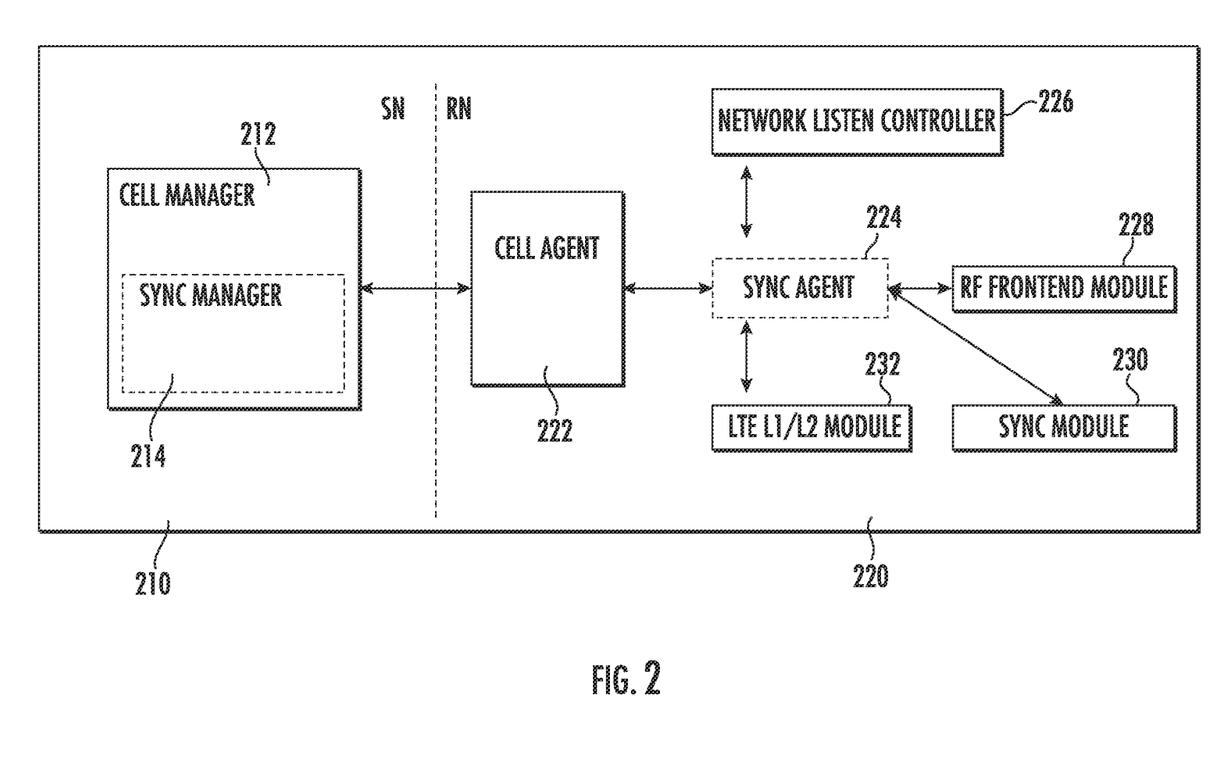
FIG. 2 shows a functional block diagram of one example of an access controller such as the Spidercloud services node.

As previously mentioned, the access controller shown above may be the Spidercloud Services Node, available from Spidercloud Wireless, Inc. FIG. 2 shows a functional block diagram of one example of an access controller 210 such as the Spidercloud services node. The access controller may include topology management, self-organizing network (SON), a services node mobility entity (SME), an operation, administration, and management (OAM) module, a PDN GW/PGW module, a SGW module, a local IP access (LIPA) module, a QoS module, and a deep packet inspection (DPI) module. Alternative embodiments may employ more or less functionality/modules as necessitated by the particular scenario and/or architectural requirements.

Over-The-Air Synchronization

In one aspect, the techniques described herein allow the RNs 115 in the RAN 110 to synchronize one another in frequency and phase by transmitting and receiving wireless signals among themselves. This can be accomplished by coordinating the radio nodes to radiate and listen at the right moment and select an appropriate source to synchronize with.

As used herein the term sync donor refers to a radio node transmitting wireless signals that serve as a synchronization source (i.e., a frequency and/or time reference) for the clock or radio oscillator of another radio node, which is referred to as a sync receiver.

As used herein the term donor list refers to an ordered list of potential sync donors stored by the RNs.

As used herein the term sync tree refers to a tree span from a directed radio environment monitoring (REM) graph obtained from a REM scan.

As used herein the term muting pattern refers a pattern of radio nodes in the sync tree that are muted (prevented from transmitting) for a period of time in order to avoid interference of parent nodes by child nodes in the sync tree.

As used herein the term hop ID refers to the logical distance, measured in units of hops, from a sync receiver to the root node that serves as the master synchronization source. For example, a sync receiver has a hop ID of 2 hops if its sync donor is itself synchronized to the master synchronization source.

FIG. 2 shows is a functional block diagram showing the pertinent components of one example of the access controller 210 (e.g., access controller 130 in FIG. 1) in communication with the pertinent components of one of the radio nodes 220. As shown, the access controller 210 includes a cell manager 212 that incorporates a sync manager 214. The sync manager 214 is responsible for the global state of all the radio nodes in the RAN. Among other things, the sync manager 214 distributes information received from individual radio nodes to the other radio nodes in the RAN when necessary. In general the sync manager 214 is responsible for those aspects of the over-the-air synchronization process that are not latency sensitive.

The cell agent 222 is the primary component in the radio node 220 that communicates with the cell manager 212. The radio node 220 also includes a sync agent 224 that communicates with and operates in cooperation with the sync manager 214 in the access controller 210. The sync manager 214 and sync agent 224 communicate with one another via the cell manager 212 and the cell agent 222. The cell agent 222 is responsible for those aspects of the over-the-air synchronization process that are latency sensitive.

The sync agent 224 communicates with a number of conventional modules in the radio node 220, including the network listen controller 226, the RF front-end module 228, the sync module 230 and the LTE L1/L2 module 232. The LTE L1/L2 module 232 manages the layer 1 (the physical layer) and layer 2 (MAC layer) functionality in the LTE air interface protocol stack. The sync agent 224 communicates with the low level network listen controller 226 and the RF front-end module 228 to tune the RF and also decode and analyze the LTE signals from the LTE L1/L2 module 232. Among other things, the sync agent 224 will mute RF transmission in accordance with the mute pattern whenever the radio node is attempting to obtain a sync signal or when the ancestors of the radio node in the sync tree are listening.

The sync manager 214 collects up-to-date information from the RNs and sends the information to all neighboring RNs. Such information includes the donor list that is maintained for each RN. Other important information that is received and distributed by the sync manager 214 specifies the quality of the sync between the radio nodes and their respective donor nodes (whether another radio node or a macro cell). After obtaining a sync tree (discussed in more detail below), the sync manager 214 sends a donor list to each radio node. The radio nodes may locally store the donor list in the cache associated with its sync agent 224. The sync manager 214 also maintains the sync status of each radio node and receives updates of sync donors' status from each radio node's perspective.

The sync manager 214 also implements a number of algorithms for coordinating the over-the-air synchronization process. For instance, one such algorithm assigns a score to the quality of synchronization sources and donors. In some embodiments the scoring may be accomplished using the results of conventional REM scans. The REM scan allows radio nodes to monitor and characterize their neighboring nodes. During each scan, one RN in the small cell RAN transmits at its maximum power and all the other RNs determine the power received from that transmitting RN. This process is repeated until every RN has scanned every other RN. Among other things, the results of these measurements provide the transmitted and received powers between each pair of RNs in the small cell RAN. In some embodiments the scoring framework may take into account measurement parameters such as RSRP, RSRQ for LTE, RSCP, RSSI, Ec/Io for UMTS. The scoring algorithm uses all this data as input metrics that are mapped to values that are used to rank the quality of the donors. The mapping that is performed may be a linear or non-linear mapping. One example of a scoring algorithm that may be employed will be presented below after further discussing the functionality of the sync manager and sync agent.

The sync manager 214 uses the data from the REM scan to construct a network topology. From this the sync manager 214 generates a directed graph having nodes corresponding to the radio nodes. In particular, conventional graph theory may be used to expand a directed REM graph to a sync tree using a minimum spanning tree algorithm. In this way the sync tree generally has a reduced number of edges relative to the directed REM graph and no cycles. In one embodiment the depth of the sync tree from the root node should be as small as possible because as the number of hops that are required from the root node to any given child node increases, the resulting sync quality will generally decrease. However, a competing factor that needs to be taken into account is the RSRP (reference signal received power) or the SNR (signal-to-noise ratio) of the sync signal since there may be a tradeoff between depth and SNR. For instance, there may be cases where a smaller sync tree depth gives rise to a lower SNR. This tradeoff can be accomplished by assigning suitable weights to each edge in the spanning tree algorithm. That is, the weights may be a function of the RSRP or SNR and the distance in units of hops.

Once the sync tree has been obtained, the sync manager 214 can generate a donor list for each radio node. The donor list specifies an ordered list of neighboring radio nodes that can be used as sync sources, ordered from the most desirable sync source to the least desirable sync source. The sync manager 214 can also use the sync tree to coordinate the booting order of the RNs according to the sync tree. Specifically, in one embodiment those RNs closest to the root sync source in terms of the number of hops should be booted up first and the RNs most remote from the root sync source in terms of the number of hops should be booted up last. By coordinating the boot order in this manner synchronization can be achieved as soon as possible. In another embodiment the boot order may be determined in accordance with a scoring framework that takes into account the quality of the signal received from the root node (e.g., a macro cell) in addition to, or instead of, the logical distance in units of hops from the root node.

In some embodiments the boot-up process may be an asynchronous process so that the any radio node can be boot up at any time. In addition, the sync manager 214 may use only the local neighbor topology of a given radio node when determining when the given radio node should boot-up. In this way it is not necessary to re-boot all the radio nodes in the system when a given radio node changes its state.

The sync manager 214 can also implement a variety of other algorithms that perform tasks such as coordinating the muting pattern for each RN in the network to improve the reliability of obtaining synchronization, for instance. Other tasks that the sync manager performs includes responding to the sync agent's donor updates and consolidating and sending updated sync trees to all sync agents.

The sync agents 224 in the radio nodes cooperate with the sync manager 214 to keep close track of the current sync status and send updates to the sync manager. The updates that are periodically provided on the current sync status may include, for instance, such information as a current estimate of timing and frequency errors, the RSRP of the sync donor and any estimates of interference when listening to a sync donor. The sync agents 224 may also be required to rapidly respond when there is a change in the RF environment or sync status. Additionally, based on the information received from the sync manager, the sync agents 224 may need to determine muting patterns to avoid interference.

The sync agents 224 are also responsible for quickly reselecting a sync donor from their respective donor lists when losing sync and informing the sync manager 214 of the change. The sync agents 224 may run predictive analyses to determine whether the RN is about to lose sync based on LTE layer 1 measurements and historical data so that action may be taken before sync is lost. In some embodiments the predictive analysis assessing sync quality to determine if the current sync donor should be changed may employ such techniques as linear or non-linear regression, outlier filtering, averaging, etc. In making this determination it should be recognized that there is a tradeoff between false alarms warning that the sync donor should be changed and failure to change sync donors before sync is lost because the cost of a missed detection may be very high. While losing sync will cause significant interference, switching sync donors too rapidly could also lead to a loss of sync as well.

In some cases the muting pattern imposed by the sync agents 224 is vendor specific and thus is coordinated with the MAC scheduler to avoid scheduling data for transmission during a muted period. The mute pattern is coordinated across the RNs to avoid interference between the RNs.

Figure 3A:
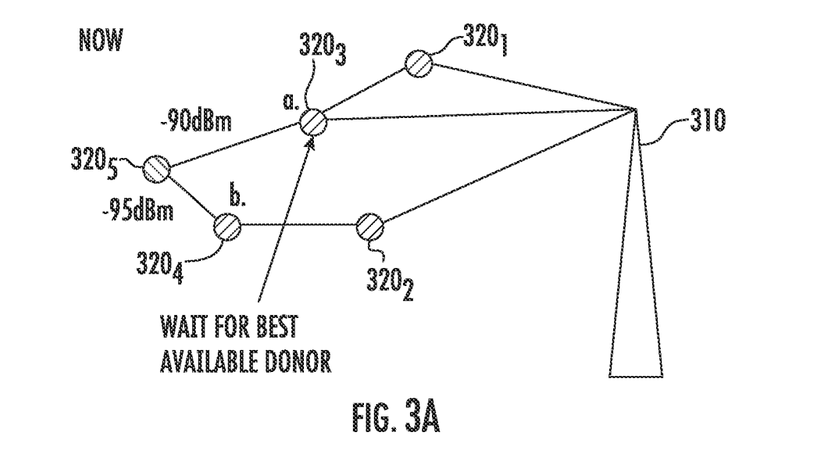
FIGS. 3a and 3b show a directed REM graph that includes a root node that is a macro cell serving as the root sync source.
Figure 3B:
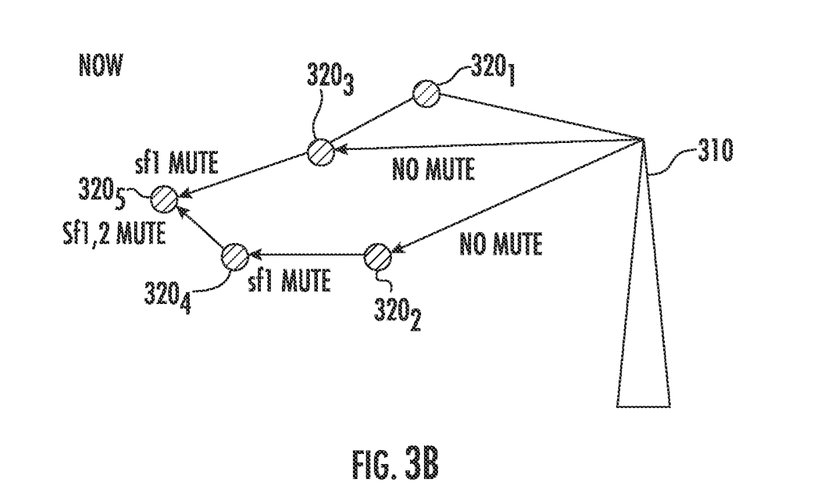

FIGS. 3a and 3b show a directed REM graph that includes a root node 310 that is a macro cell serving as the root sync source. The REM graph includes radio nodes 3201, 3202, 3203, 3204 and 3205. Radio node 3205 is currently not synced and needs to determine if neighboring radio nodes 3203 or 3204 is the best sync donor. As shown by the bold arrows in FIG. 3b radio node 3203 is selected as the best sync donor because it is only two hops away from the root node 320, whereas radio node 3204 is 3 hops away from the root node 320. This decision assumes, of course, that all other pertinent parameters such as RSRP or SNR are equal for both radio nodes 3203 and 3204.

One example of a scoring algorithm that may be employed to rank the donors will now be presented. A part of the synchronization acquisition process involves decoding one or more of the standard subframe signals received from the donors. These signals include the Primary Sync Signal (PSS), the Secondary Sync Signal (SSS), and the Cell Reference Signal (CRS) of the donor cell. Because the CRS is transmitted at more frequent intervals than the other signals, it may be the primary signal that is used for sync tracking.

For tracking donors, the scoring of each neighbor cell x is given by:

$$score(x)=h(x)-g(x\_d)$$

where:
x_d is the distance of cell x in the sync graph from the macro cell;
h(x) is a function that represents the signal quality for cell x (examples of the function h(x) may include, for example, the RSSI from cell x, the SINR from cell x, or a function of the two metrics);
g(x) may be a class of functions taking the form:
$g(x)=a+bx+cx^2+$, where a, b, c, . . . , are constants (i.e., a polynomial function)—
$g(x)=a+bx+cx^{0.5}+$(the exponents being any fractional number g(x) alternatively could be an exponential functions taking the form:
$g(x)=a+e\_1^x+e\_2^x+$ . . . , where a, e_1, e_2, . . . are constants
a special case of e_1 could be Euler's number, i.e., exp(1)
g(x) could be a mixture of functions of the aforementioned function classes. g(x) could be an adaptively changing function according to the synchronization performance, and use a different function class as needed.

Figure 4:
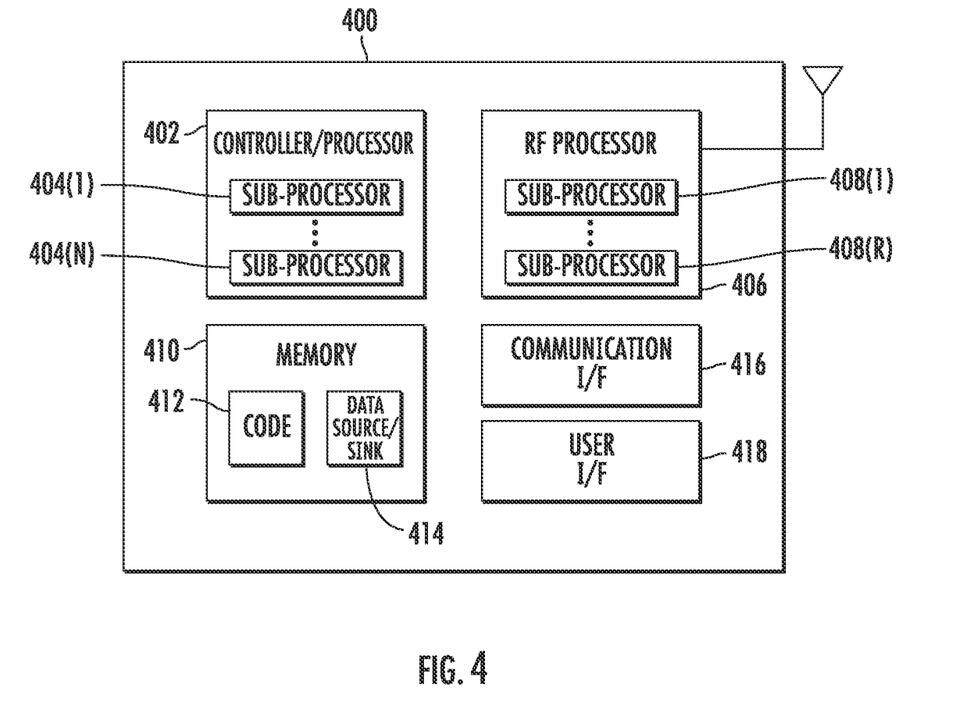
FIG. 4 is a schematic diagram of an exemplary computer system that can be implemented for a radio cell of a RAN or a user mobile communications device that may be configured to facilitate an automatic cell discovery process for a target RAN to discover a source RAN cell by the source RAN cell initiating a fake handover request to the target RAN, wherein the computer system is adapted to execute instructions from an exemplary computer readable link.

In one particular embodiment, the ranking or ordering of cells on the donor list may be performed in a pairwise manner using the scoring algorithm described above. For instance, a function f(x,y) may be defined which returns either cell x or cell y as the better donor. With each cell input x and y, a list of attributes associated with the cell is also passed along. The algorithm may operate as follows:
Let best_cell=the first neighbor_cell
for all neighbor_cell in neighbor_cell list:
    best_cell=f(best_cell, neighbor_cell)
Where function f is given as:
f(x,y):
    score_x=h(x)−g(d x)
    score_y=h(y)−g(dy)
    return argmax(score_x, score_y)
Illustrative attributes associated with each neighbor cell may include:
    the SNR (dB), denoted as SNR_i
    the sync status (true/false), denoted as SS_i
    the wait status (true/false), denoted as WS_i
    hop id ([0:max hop]), denoted as HOP_i
    A constant penalty for cells that are currently in the waiting state, denoted as PEN.
The pairwise ordering process may then proceed as illustrated by the following pseudocode:
def f(i,j):
    if(HOP_i>HOP_j)
    if WS_i is TRUE AND SNR_i>SNR_j+PEN
        return i
    else
        return j
    if(HOP_j>HOP_i)
    if WS_j is TRUE AND SNR_j>SNR_i+PEN
        return j
    else
        return i
    if (SS_i is TRUE AND SS_j is TRUE) OR (WS_i is EQUAL to WS_j)
    if(snr_i>snr_j)
        return i
    else
        return j
    if(WS_i is TRUE)
        return i
    else
        return j FIG. 4 shows a simplified functional block diagram of an illustrative computer system 400 that can be included in any devices described herein including those devices involved with synchronizing in frequency and phase, a radio node (RN) in a small cell radio access network (RAN). For example, the computer system 400 can be included in, without limitation, the RN 115 and access controller 130 in FIG. 1, the access controller 210 in FIG. 2, the cell manager 212 in FIG. 2, the sync manager 214 in FIG. 2, the cell agent 222 in FIG. 2. The computer system 400 includes a controller/processor 402 typically handles high level processing. The controller/processor 402 may include one or more sub-processors 404(1)-704(N) or cores that are configured to handle specific tasks or functions. An RF processor 406 implements various signal processing functions for the downlink including the lower level L1 processing. The RF processor 406 may include one or more sub-processors 408(1)-408(R) or cores that are configured to handle specific tasks or functions. A memory 410 is a computer-readable medium that stores computer-readable code 412 that is executable by one or more processors including the controller/processor 402 and/or the RF processor 406. The memory 410 may also include various data sources and data sinks (collectively represented by element 414) that may provide additional functionalities.

The code 412 in typical deployments is arranged to be executed by the one or more processors to facilitate the discovery of a neighboring radio access system or cells reporting to a serving RAN. The code 412 additionally enables implementation of both the dedicated PCI identity and common PCI identity using the same hardware infrastructure in a given dual identity cell when executed. The hardware infrastructure may also include various interfaces (I/Fs) including a communication I/F 416 which may be used, for example, to implement a link to an access controller (e.g., access controller 130 in FIG. 1, or access controller 210 in FIG. 2), LAN, or to an external processor, control, or data source. In some cases, a user I/F 418 may be utilized to provide various indications such as power status or to enable some local control of features or settings. The RF processor 406 may be eliminated in some applications and any functionality that it provides that is needed to implement the access controller may be provided by the controller/processor 402.

Several aspects of telecommunication systems will now be presented with reference to access controllers, radio nodes, base stations and UEs described in the foregoing description and illustrated in the accompanying drawing by various blocks, modules, components, agents circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The invention claimed is:

1. A wireless communication system, comprising:
a plurality of radio nodes (RNs) each configured to serve a respective one of a plurality of radio coverage areas; and
an access controller coupled to the plurality of RNs and configured to:
generate a donor list representing an ordered list of wireless access points among the plurality of RNs that can serve as a source of a wireless sync signal for any selected RN among the plurality of RNs; and
distribute the donor list to the selected RN.

2. The wireless communication system of claim 1, wherein the selected RN is configured to:
determine a selected wireless access point from the ordered list of wireless access points to use as the source of the wireless sync signal;
synchronize a respective clock in phase and frequency based on the wireless sync signal received from the selected wireless access point; and
provide information concerning a current sync status to the access controller.

3. The wireless communication system of claim 2, wherein the selected RN is further configured to provide the information concerning the current sync status to the access controller periodically.

4. The wireless communication system of claim 2, wherein the selected RN is further configured to determine a different wireless access point from the ordered list of wireless access points to use as the source of the wireless sync signal when synchronization to the selected wireless access point is lost.

5. The wireless communication system of claim 1, wherein the access controller is further configured to assign a respective score to each wireless access point in the ordered list of wireless access points to indicate a respective quality rank when used as the source of the wireless sync signal.

6. The wireless communication system of claim 1, wherein the access controller is further configured to generate the donor list by generating a directed graph having a plurality of nodes each corresponding to a respective one of the plurality of RNs.

7. The wireless communication system of claim 6, wherein the access controller is further configured to expand the directed graph to obtain a sync tree using data obtained from a radio environment monitoring (REM) scan.

8. The wireless communication system of claim 7, wherein the access controller is further configured to expand the directed graph using a minimum spanning tree algorithm to thereby minimize a depth of the sync tree from a root node serving as a master synchronization source to any child node, the depth of the sync tree being measured in units of hops from the root node to any given child node.

9. The wireless communication system of claim 7, wherein the access controller is further configured to:
coordinate a boot order among the plurality of RNs based on the sync tree;
instruct a respective one of the plurality of RNs to boot up first when the respective one of the plurality of RNs is closest to a root node of the sync tree in units of hops; and
instruct the respective one of the plurality of RNs to boot up last when the respective one of the plurality of RNs is farthest from the root node of the sync tree in the units of hops.

10. The wireless communication system of claim 7, wherein the access controller is further configured to coordinate a muting pattern to thereby prevent a respective one of the plurality of RNs from transmitting under any one or more of the following conditions:
the respective one of the plurality of RNs is attempting to obtain the wireless sync signal; and
any other one of the plurality of RNs closer to a root node in the sync tree than the respective one of the plurality of RNs is listening for the wireless sync signal.

* * * * *

UNITED STATES PATENT AND TRADEMARK OFFICE
CERTIFICATE OF CORRECTION

| | |
|---|---|
| PATENT NO. | : 11,832,199 B2 |
| APPLICATION NO. | : 18/096263 |
| DATED | : November 28, 2023 |
| INVENTOR(S) | : Tsung-Yi Chen et al. |

It is certified that error appears in the above-identified patent and that said Letters Patent is hereby corrected as shown below:

In the Specification

In Column 1, Line 10, delete "11/096,136," and insert -- 11,096,136, --.

Signed and Sealed this
Seventh Day of May, 2024

Katherine Kelly Vidal
*Director of the United States Patent and Trademark Office*